(12) United States Patent
Deluca et al.

(10) Patent No.: US 8,312,089 B2
(45) Date of Patent: Nov. 13, 2012

(54) APPARATUS, SYSTEM, AND METHOD FOR EMAIL RESPONSE TIME ESTIMATION BASED ON A SET OF RECIPIENTS

(75) Inventors: Lisa Seacat Deluca, Research Triangle Park, NC (US); Itzhack Goldberg, Research Triangle Park, NC (US); Ohad Greenshpan, Research Triangle Park, NC (US); Boaz Mizrachi, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 12/578,486

(22) Filed: Oct. 13, 2009

(65) Prior Publication Data
US 2011/0087744 A1 Apr. 14, 2011

(51) Int. Cl.
*G06F 15/16* (2006.01)
(52) U.S. Cl. .................. 709/206; 709/203; 709/207
(58) Field of Classification Search .................. 709/206, 709/207, 203
See application file for complete search history.

(56) References Cited

U.S. PATENT DOCUMENTS

| | | | | |
|---|---|---|---|---|
| 2004/0243679 | A1* | 12/2004 | Tyler | 709/206 |
| 2009/0037532 | A1* | 2/2009 | Estrada | 709/205 |
| 2010/0017194 | A1* | 1/2010 | Hammer et al. | 704/9 |
| 2010/0017484 | A1* | 1/2010 | Accapadi et al. | 709/206 |
| 2010/0169264 | A1* | 7/2010 | O'Sullivan et al. | 706/52 |
| 2010/0211592 | A1* | 8/2010 | Brownlee | 707/769 |
| 2010/0250682 | A1* | 9/2010 | Goldberg et al. | 709/206 |

\* cited by examiner

*Primary Examiner* — Liangche A Wang
*Assistant Examiner* — Cheikh Ndiaye
(74) *Attorney, Agent, or Firm* — Jeffrey T. Holman (57) ABSTRACT

An apparatus, system, and method are disclosed to dynamically estimate a response time while composing an email. A recipient module determines a set of email recipients identified by a user. The set of email recipients comprises intended recipients of a new email message from the user. A response time identification module determines a response time trend for each email recipient. Each response time trend has information relating to previous email response times of an email recipient. An estimate module determines an estimated response time for the new email message based on the retrieved response time trends. A display module displays a visual representation of the response time to the user.

14 Claims, 6 Drawing Sheets

APPARATUS, SYSTEM, AND METHOD FOR EMAIL RESPONSE TIME ESTIMATION BASED ON A SET OF RECIPIENTS

BACKGROUND

1. Field of the Invention

This invention relates to email response time trends and more particularly relates to email response time estimation based on a set of email recipients.

2. Description of the Related Art

Unlike more traditional communication methods, many electronic communication methods lack immediate feedback. When communicating verbally, one can hear and often see other participants in the conversation, and their responsiveness and availability can easily be gauged. When communicating via email, instant messaging, or online via blogs, forums, wiki's, or other collaboration tools, however, other participants can be located throughout the world, and traditional verbal and visual feedback is not available to gauge responsiveness and availability.

If an email message is urgent, it can be important to know when one can expect to receive a response. It can also be important to know how soon to follow up an email with an additional communication if a response is not received. Sending multiple messages requesting the same response, when the recipient has not yet read the original message, can be inefficient and counterproductive for the sender. Likewise, unnecessarily delaying a response to an email message, or forgetting to respond, is also inefficient.

Other factors, such as time differences, conflicting schedules, and vacations, can also affect email responsiveness. These factors may be unknown to an email's sender, who may be futilely waiting for a response from an unavailable recipient. Traditionally, some email and instant messaging clients show an available/unavailable status that indicates whether or not a user is currently at their computer. While useful, the fact that a user is at their computer, does not necessarily mean that they will respond. Additionally, a user can typically override their status. A user may, in reality, be available and responsive, while their status is unavailable, or unresponsive while their status if available.

BRIEF SUMMARY

From the foregoing discussion, it should be apparent that a need exists for an apparatus, system, and method for response time estimation for email messages. Beneficially, such an apparatus, system, and method would estimate a response time while composing a new email message, based on a set of email recipients.

The present invention has been developed in response to the present state of the art, and in particular, in response to the problems and needs in the art that have not yet been fully solved by currently available email responsiveness metrics. Accordingly, the present invention has been developed to provide an apparatus, system, and method for email response time estimation that overcome many or all of the above-discussed shortcomings in the art.

The apparatus to estimate a response time based on a set of recipients for an email message is provided with a plurality of modules configured to functionally execute the necessary steps of response time estimation. These modules in the described embodiments include a recipient module, a response time module, a trend module, an estimate module, a display module, a recipient suggest module, an optional response module, and a desired response module.

In one embodiment, the recipient module determines a set of email recipients identified by a user. In a further embodiment, the set of email recipients comprises intended recipients of a new email message from the user.

In one embodiment, the response time module determines one or more response times for each email recipient. Each response time, in another embodiment, is based on an elapsed time between a send time that a user sends an email message and a receive time that the user receives a response to the email message.

In one embodiment, the trend module determines a response time trend for each email recipient. In a further embodiment, each response time trend is based on the one or more response times of an email recipient. Each response time trend, in one embodiment, corresponds to a content identifier for the new email message.

In one embodiment, the estimate module determines an estimated response time for the new email message based on the response time trends. In another embodiment, the estimate module dynamically updates the estimated response time in response to the user updating the set of email recipients. In a further embodiment, the estimated response time comprises one of a minimum estimated time, an average estimated time, and a maximum estimated time in which the user is likely to receive a response to the new email message based on the response time trend for each of the email recipients.

In a further embodiment, the estimate module bases the estimated response time for the new email message on a content identifier for the new email message. The estimate module, in one embodiment, updates the estimated response time for the new email message based on schedule information of at least one of the email recipients. In another embodiment, the schedule information comprises one or more calendar items.

In a further embodiment, the estimate module determines an individual estimated response time for each of the one or more email recipients. In a further embodiment, the estimate module bases the estimated response time for the new email message on a response time trend for a time period corresponding to a composition time for the new email message. In one embodiment, the display module displays a visual representation of the estimated response time to the user.

In one embodiment, the recipient suggest module suggests a suggested recipient from a plurality of recipients for the user to add to the set of email recipients. In a further embodiment, the recipient suggest module selects the suggested recipient based on a response time trend corresponding to the suggested recipient, such that an addition of the suggested recipient to the set of email recipients lowers the estimated response time. In another embodiment, the recipient suggest module selects the suggested recipient based on a relationship between the suggested recipient and at least one of the email recipients. The recipient suggest module, in one embodiment, selects the suggested recipient based on a content identifier for the new email message.

In one embodiment, the optional response module determines one or more optional response recipients identified by the user. In a further embodiment, the one or more optional response recipients comprise intended recipients of the new email message whose response time trends are factored out of the estimated response time for the new email message.

In one embodiment, the desired response module identifies a designation from the user that represents a desired number of responses to the new email message. The estimated response time for the new email message, in one embodiment, comprises an estimated amount of time in which the user is likely to receive the desired number of responses to the new email message based on the response time trends.

In a further embodiment, the desired response module identifies a plurality of designations from the user that each correspond to a subset of the set of email recipients. In one embodiment, each designation represents a desired number of responses to the new email messages from the corresponding subset of the set of email recipients. The estimated response time for the new email message, in one embodiment, comprises an estimated amount of time in which the user is likely to receive each desired number of responses from each subset of the set of email recipients.

A system of the present invention is also presented to estimate a response time based on a set of recipients for an email message. The system may be embodied by a data storage repository and an email client computing device. In particular, the email client computing device, in one embodiment, includes a new message module that is substantially similar to the apparatus described above.

The data storage repository, in one embodiment, is configured to store a plurality of email response time trends. In one embodiment, each email response time trend is associated with an email recipient. The email client computing device, in one embodiment, is in communication with the data storage repository. In a further embodiment, the email client computing device comprises a new message module that is configured to determine an estimated response time for a new email message from a user.

A method and a computer program product of the present invention are also presented to estimate a response time based on a set of recipients for an email message. The method and the operations of the computer program product in the disclosed embodiments substantially include the steps necessary to carry out the functions presented above with respect to the operation of the described apparatus and system.

In one embodiment, the method and operations include determining a set of email recipients identified by a user, the set of email recipients comprising intended recipients of a new email message from the user. In another embodiment, the method and operations include determining a response time trend for each email recipient, each response time trend comprising information relating to previous email response times for an email recipient. In a further embodiment, the method and operations include determining an estimated response time for the new email message based on the response time trends. The method and operations, in another embodiment, include displaying a visual representation of the estimated response time to the user.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

Figure 1:
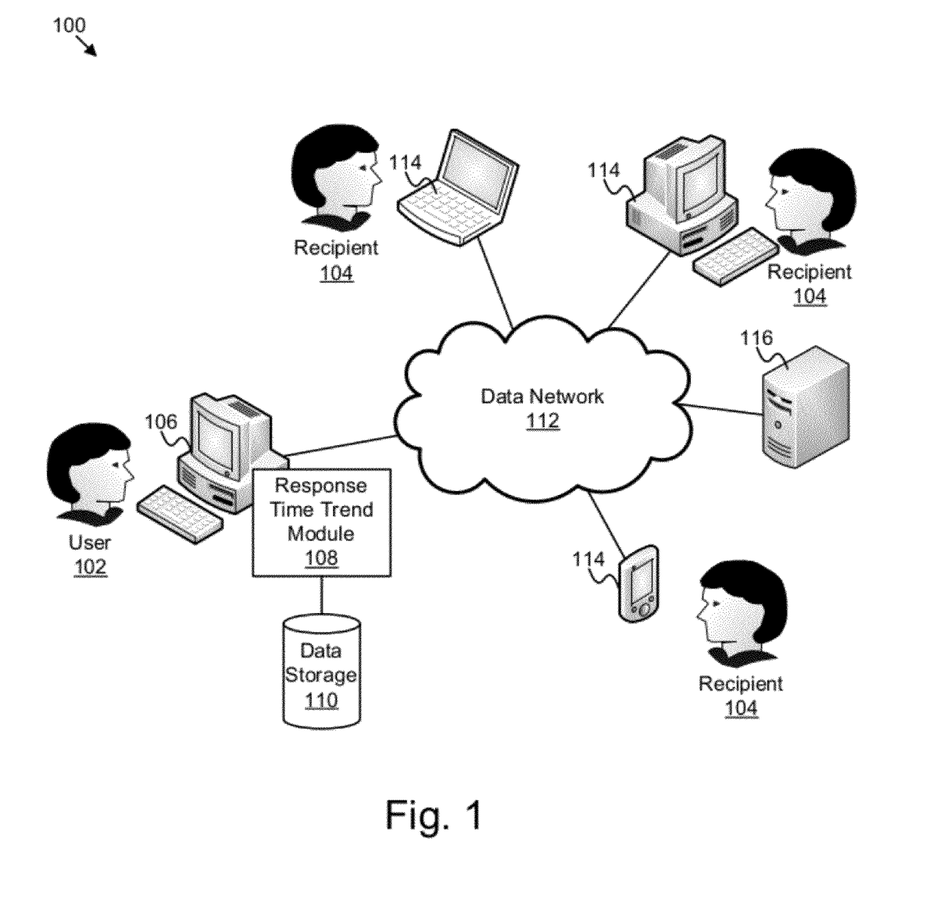
FIG. 1 is a schematic block diagram illustrating one embodiment of a system to estimate a response time based on a set of recipients for an email message in accordance with the present invention.

FIG. 1 depicts one embodiment of a system 100 for estimating a response time based on a set of recipients for an email message. In general, the system 100 determines and retains email response time trends of one or more recipients 104 for a user 102 for use in estimating a response time for an email message from the user 102 to the one or more recipients 104. In the depicted embodiment, the system 100 comprises a user computing device 106, a response time trend module 108, a data storage repository 110, a data network 112, one or more recipient computing devices 114, an email server 116.

In one embodiment, the user 102 is an email user that sends email messages to and receives email messages from the one or more recipients 104. The user 102, in one embodiment, uses an email client application on the user computing device 106 to send and to receive email messages. The email client application may comprise a software application installed on the user computing device 106, a network or web application that is accessible to the user 102 on the user computing device 106, or another application that allows the user 102 to send and receive email messages. The user computing device 106 comprises a processor and a memory that store and execute program code. The computing device 106, for example, may comprise a desktop computer, a laptop computer, a cellular telephone, a personal digital assistant, a portable gaming or multimedia device, and the like.

To send and receive email messages, the user computing device is connected to the data network 112. The data network 112 may comprise a public or private, local or wide area, data network. In one embodiment, the data network 112 comprises the Internet. The email client application on the user computing device 106 may send and receive email messages through the email server 116, using the Simple Mail Transfer Protocol ("SMTP"), the Post Office Protocol ("POP"), the Internet Message Access Protocol ("IMAP"), or another email protocol. The email server 116 is connected to the data network 112, and is in communication with the user computing device 106. In one embodiment, the email server 116 may comprise a plurality of email servers that transfer email messages between the user 102 and the one or more recipients 104.

Each of the one or more recipients 104 may send and receive email messages using the recipient computing devices 114. In one embodiment, the recipient computing devices 114 each comprise a processor and a memory that store and execute program code. The recipient computing devices 114 may be substantially similar to the user computing device 106 described above. Each of the recipient computing devices 114 is connected to the data network 112, such that the recipient computing devices 114 can send and receive email messages through the email server 116 and/or other email servers.

In one embodiment, the response time trend module 108 determines response time trends for the one or more recipients 104. As used herein, recipient refers to either a single recipient or a group of recipients sharing a common attribute (i.e. all recipients of the marketing group). The response time trend module 108 may be integrated with, installed on, or otherwise in communication with the user computing device 106 and/or the email server 116. In one embodiment, the response time trend module 108 is integrated with the email client application that is installed on or accessible from the user computing device 106. The response time trend module 108 may determine response time trends of the one or more recipients 104 specifically for the user 102, or, in another embodiment, may determine response time trends of the one or more recipients 104 relative to a plurality of users 102. In one embodiment, the response time trend module 108 is local to the user computing device 106, and determines response time trends for the one or more recipients 104 relative to the user 102 based on email messages accessible to the user 102. In this manner, the response time trend module 108 can determine response time trends for the user 102 without extra interactions with or privacy intrusions on the one or more recipients 104.

A response time trend comprises a general tendency or course of behavior for a given recipient or group of recipients relating to an amount of time taken for one of or a group of the one or more recipients 104 to respond to an email message from the user 102. Example time information that defines a response time trend may include a minimum response time of a recipient, an average response time of a recipient, a maximum response time of a recipient, or the like.

A response time trend may be general, or may be specific to a predefined time or time period. For example, a response time trend may be specific to a time of day or a day of the week. A response time trend may also take schedule information of a recipient into account. A response time trend may also be specific to a content identifier for the sent and received email messages, such as a work email response time trend and a personal email response time trend.

"Content identifier," as used herein, means an identifier for an attribute of an associated email message. A content identifier may identify a principle subject matter of an associated email message, a type or number of attachments included in an associated email message, a priority level of an associated email message, one or more classifications of an associated email message, one or more user defined tags for an associated email message, or other attributes of an associated email message. In a further embodiment, a content identifier may be selected from a hierarchy of content identifiers, or the like. An email message may have a single content identifier, or may have a plurality of content identifiers. Content identifiers may be determined by the user 102, a recipient 104, or by the response time trend module 108. The response time trend module 108 is discussed in greater detail with regard to FIG. 2.

In one embodiment, the response time trend module 108 is in communication with the data storage repository 110. In one embodiment, the data storage repository 110 comprises non-volatile data storage, such as magnetic storage, optical storage, flash storage, and/or other types of data storage. The data storage repository 110 may be installed on or in communication with the user computing device 106, with the mail server 116, or may otherwise be in communication with the response time trend module 108. In one embodiment, the response time trend module 108 is in communication with the data storage repository 110 over the data network 112. In a further embodiment, the data storage repository 110 may comprise a data structure, or data storage software, such as a database, a data file, or the like.

The response time trend module 108, in one embodiment, may store response time trends on the data storage repository 110. The response time trend module 108 may store the response time trends in one or more mail files of the user 102, such as a mailbox file, individual email files, a configuration file, a metadata file, or the like, or in an independent data structure or file. The response time trend module 108, in another embodiment, may store other response time information, such as individual email response times, historical response time data, and the like on the data storage repository 110.

Figure 2:
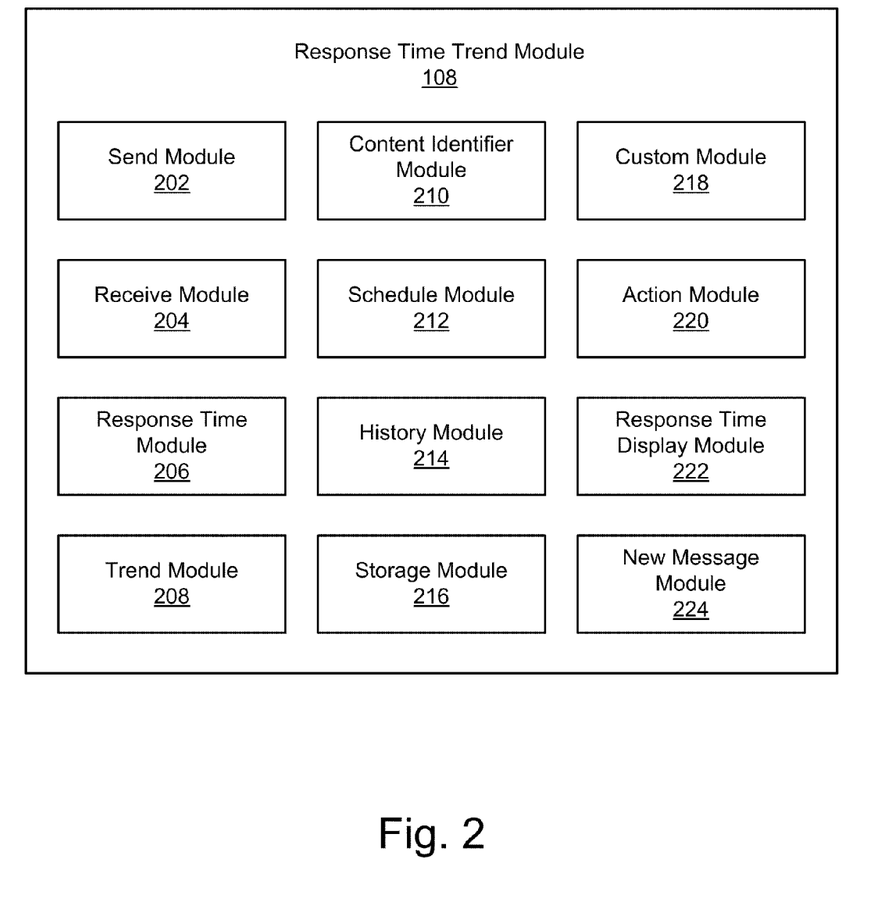
FIG. 2 is a schematic block diagram illustrating one embodiment of a response time trend module in accordance with the present invention.

FIG. 2 depicts one embodiment of the response time trend module 108. In the depicted embodiment, the response time trend module 108 comprises a send module 202, a receive module 204, a response time module 206, a trend module 208, a content identifier module 210, a schedule module 212, a history module 214, a storage module 216, a custom module 218, an action module 220, a response time display module 222, and a new message module 224.

In one embodiment, the send module 202 determines a time that the user 102 sends an email message to a recipient 104, or the send time of the email message. The send module 202 may determine the send time in response to the user 102 sending the email message, or may determine the send time that the user 102 previously sent the email message using email header data, metadata in a mail file, an archived copy of the email message, or the like.

In one embodiment, the receive module 204 determines a time that the user 102 receives a response to the email message from the recipient 104, or the receive time of the response. Like the send module 202, the receive module 204 may determine the receive time in response to the user 102 receiving the response to the email message, or may determine the receive time that the user 102 previously received the response using email header data, metadata in a mail file, an archived copy of the email message, or the like.

In a further embodiment, the receive module 204 determines that a received email message is a response to the previously sent email message, correlating the response and the email message. In one embodiment, the receive module 204 correlates the next email message from the recipient 104 to the sender with the previously sent email message. In another embodiment, the receive module 204 may use one or more identifiers, such as a 'Message-ID' or 'In-Reply-To' header field or the like, a subject field, a matching recipient/sender, a matching content identifier for the email messages, and the like to correlate a response message with the email message.

In one embodiment, the content identifier module 210 described below determines a content identifier for the sent message and for the received email message. In a further embodiment, the receive module 204 uses the content identifier for a received email message and one or more additional aspects of the received email message to determine that the received email is a response to the previously sent email message even if a 'Message-ID,' a sender's email address, a subject field, or the like does not match. In this manner, the response time trend module 108 can determine a reliable response time trend, even when a response is sent by the recipient 104 from a different email account, is not a direct reply, does not share a common subject field, or the like.

In one embodiment, the receive module 204 may determine that certain predefined types of emails are not valid responses. For example, in one embodiment, the receive module 204 may recognize a received email as a delivery receipt, a read receipt, an auto-reply, an out-of-office reply, an automated message, or the like, and may determine that the received email is not a valid response to the email message. As described below, in one embodiment, the schedule module 212 may adjust a response time trend based on a received email, even if the received email is not a valid response to the email message, for greater accuracy in determining response time trends. In a further embodiment, the schedule module 212 may adjust a response time trend by excluding response time information from the response time trend in response to receiving an out-of-office reply, or the like, such that the response time trend is not improperly skewed by an abnormally long response time.

In one embodiment, the response time module 206 determines a response time corresponding to the email message. The response time module 206 bases the response time on an elapsed time or difference in time between the send time that the send module 202 determines and the receive time that the receive module 204 determines. The response time, in one embodiment, is specific to the email message, the user 102, and the recipient 104. In a further embodiment, the response time is also specific to a content identifier that the content identifier module 210 determines for the email message. The response time module 206 may mark, flag, or otherwise identify the response time as corresponding to the user 102, the recipient 104, and/or the content identifier.

In one embodiment, the trend module 208 uses the response time that the response time module 206 determines to determine a response time trend that corresponds to the recipient 104. In another embodiment, the response time trend also corresponds to a determined content identifier for the email message. The trend module 208 may also use a plurality of previous response times of the recipient, determined based on a plurality of previous email messages between the user 102 and the recipient 104. In one embodiment, the plurality of previous email messages that the trend module 208 uses to determine the response time trend match the determined content identifier for the email message.

A response time trend comprises historical response time information corresponding to the recipient 104. In one embodiment, a response time trend may comprise discrete values, such as a minimum response time, an average response time, a maximum response time, and the like. An average response time may comprise a mean, a median, a mode, or another average-type representation of historical response times of the recipient 104. In another embodiment, the response time trend may comprise an equation, function, graph, map, table, or the like of historical response times, or of average response times.

The trend module 208, in one embodiment, may determine separate response time trends for various time periods, such as each day of the week, or the like. In a further embodiment, response time trends may be based on or indexed by send times of email messages from the user 102 to the recipient 104. A response time trend may further comprise an intraday response time trend, representing response time trends of the recipient 104 throughout an individual day. In another embodiment, the trend module 208 may determine response time trends based on other factors, such as trends for the most recent week, month, year, or the like, a received time of a read receipt, a number of recipients, a length of the email message, a priority or urgency level of the email message, and the like.

For example, in one embodiment, a response time trend for the recipient 104 may comprise a data structure, such as a table, an array, a list, or the like, that holds various response time values for discrete periods of time, such as a minimum, average, and maximum response time for every day, every hour, every fifteen minutes, or the like. A response time trend may comprise a plurality of data structures, for example, one for each day of the week, for each hour, for each content identifier, or the like. Response time trends, in another embodiment, may be marked, tagged, indexed, or otherwise identified by a corresponding recipient, content identifier, time period, send time, receive time, and/or other characteristic to increase the accessibility and usability of the response time trends.

In one embodiment, a response time trend relates to email communication between the user 102 and the recipient 104. In a further embodiment, a response time trend may relate to email communications between a plurality of users and the recipient 104, or to email communications between the user 102 and a plurality of recipients 104. A response time trend, in another embodiment, may relate to email communications between a plurality of users and a plurality of recipients based on a separate factor, such as a content identifier for email messages, a classification of user or recipient, a time period, send times, receive times, and the like.

In one embodiment, the content identifier module 210 determines a content identifier for the email message. A content identifier is an identifier that represents an attribute of the email message. The content identifier may originate from or include terms or phrases from the subject line or body of the email message or comprise an identifier representative of an attribute of the email message such as a principle subject matter for the email message, a type or number of attachments included in the email message, a priority level of the email message, a classification of the email message, a user defined tag for the email message, or another attribute of the email message. As an identifier, a content identifier may comprise a tag or category assigned to the email message, one or more words or phrases parsed from the email message, a characteristic of the email message, or the like. Content identifiers may be arranged in a hierarchy, with sub-content identifiers having greater specificity than parent content identifiers. The content identifier module 210 may determine a content identifier for the email message and for a received email to assist the receive module 204 in determining that the received email is a response to the email message.

In one embodiment, a user, such as the user 102 or the recipient 104, determines a content identifier for the sent email message. The content identifier module 210, in one embodiment, may provide the user a list of content identifiers, and the user may select one or more of the content identifiers for the email message. In another embodiment, a user may input one or more content identifiers for the email message, for example by entering the content identifiers into a content tagging interface or the like that the content identifier module 210 presents to the user. The user 102, in one embodiment, may provide the content identifier for the sent email message during composition of the sent email message. In another embodiment, the recipient 104 may provide the content identifier for the sent email message during composition of a response to the sent email message.

In a further embodiment, the content identifier module 210 parses content from the email message to determine a content identifier for the email message. The content identifier module 210 may search or scan the email message for one or more predefined words or phrases, may count or index words found in the email message, or may otherwise parse content from the email message such that the content identifier module 210 can compare parsed content from the email message with content from previous email messages to determine the content identifier. The content identifier module 210, in a further embodiment, may use a specific portion of the email message, such as the subject line, a signature, or the like, to determine a content identifier for the email message.

In one embodiment, the content identifier module 210 may base the content identifier on a subject matter of the email message as recited in the subject field of the email message or parsed from the body of the email message. In another embodiment, the content identifier module 210 may base the content identifier on another attribute of the email message, such as a number or type of attachments, an email type, such as forward, reply, or new, a length of the email message, or on other attributes. In one example embodiment, the content identifier module 210 may determine that email messages with words like "lunch," "movie," "game," "vacation," and the like have a "personal" content identifier, while email messages with words like "deadline," "report," "meeting," "draft," and the like have a "work" content identifier. In a further embodiment, the content identifier module 210 may select one or more words or phrases from an email message as a content identifier for the email message. In another embodiment, the content identifier module 210 may determine multiple content identifiers for a single email message.

The content identifier module 210, in a further embodiment, may determine the content identifier based on metadata associated with the recipient 104. For example, in one embodiment, the content identifier module 210 may maintain or access metadata defining certain recipients as "work" contacts, others as "family" contacts, and others as "friend" contacts, or the like, and may determine the content identifier based on the metadata. The content identifier module 210 may access recipient metadata in an address book, a directory, in emails to or from a recipient, in a mail file, or in another location accessible to the content identifier module 210.

In one embodiment, the trend module 208 determines response time trends based on content identifier. For example, the trend module 208 may determine a plurality of response time trends for a single recipient 104, based on a plurality of response times that the content identifier module 210 identifies in responses from the recipient 104. In that manner, if the recipient 104 tends to respond more quickly to email messages of a particular content identifier, and less quickly to email messages of another, the trend module 208 will accurately represent that fact in separate response time trends for each content identifier, both separate response time trends corresponding to the same recipient 104.

In one embodiment, the schedule module 212 adjusts the response time trend that the trend module 208 determines based on schedule information of the recipient 104. Schedule information comprises data that indicates a past, present, or future availability or unavailability of the recipient 104. Schedule information, in one embodiment, may comprise a time zone of the recipient 104, calendar items of the recipient 104, a location of the recipient 104, or other information relating to the availability or responsiveness of the recipient 104. Examples of calendar items, in one embodiment, include meetings, appointments, holidays, vacations, meals, breaks, trips, work hours, and the like. The schedule module 212, in one embodiment, retrieves schedule information of the recipient 104 from a shared calendar over the data network 112. In another embodiment, the schedule module 212 discovers schedule information using a content analysis of an email message. For example, the schedule module 212, in one embodiment, may parse schedule information from an "out of office" email response, a meeting request email, a flight itinerary email, an event invitation email, and the like.

Adjusting the response time trend may comprise altering the response time trend, adding information to the response time trend, removing a response time from the response time trend, or otherwise adjusting the response time trend based on schedule information. For example, the schedule module 212, in one embodiment, may adjust a response time trend to reflect an event that that the recipient 104 has scheduled, may add information about the event to the response time trend, may make a copy of the response time trend and adjust the copy to reflect the event, or the like. In a further embodiment, the schedule module 212 may adjust a response time trend by excluding one or more response times from the response time trend in response to schedule information, such that the response time trend is not improperly skewed by an abnormally long response time relating to the schedule information.

In one embodiment, the history module 214 updates the response time trend based on one or more stored email messages sent to the recipient 104 and on one or more corresponding stored response messages from the recipient 104. The stored emails may comprise archived emails, imported emails, or other previously sent emails that are accessible to the history module 214. In one embodiment, the stored email messages comprise emails sent from the user 102 to the recipient 104. In another embodiment, the stored email messages comprise email messages having a certain content identifier, email messages from a certain classification or group of senders, or another related group of email messages.

By updating the response time trend based on stored email messages, the history module 214 increases the accuracy of the response time trend for the recipient 104 without waiting for additional future correspondence. In one embodiment, the send module 202, the receive module 204, the response time module 206, the trend module 208, and/or the content identifier module 210 assist the history module 214 in updating the response time trend, substantially as described above.

In one embodiment, the storage module 216 stores the response time trend in the data storage repository 110. In a further embodiment, the storage module 216 stores response time data corresponding to the email message in the data storage repository 110. Response time data corresponding to the email message, in one embodiment, may comprise the send time of the email message, the receive time of the email message, the response time of the recipient 104, and/or other data associated with the email message and the response.

The storage module 216, in one embodiment, may store the response time trend and/or the response time data in a manner such that the information is accessible using a recipient, content identifier, time period, send time, receive time, and/or other characteristic as an identifier or key. For example, the storage module 216 may store the response time trend and/or the response time data in a database or data structure that is indexed or keyed by one or more characteristics.

In one embodiment, the custom module 218 determines a custom response time trend based on the response time data that the storage module 216 stores. The custom response time trend, in one embodiment, is defined by a user, such as the user 102. The custom module 218, in one embodiment, may allow custom access to response time data, providing more specific trends than those that the trend module 208 determines. For example, the custom module 218, in one embodiment, may search, scan, or query response time data to determine a custom response time trend based on user-selected parameters, such as send time, receive time, sender, content identifier, number of recipients, attachments, message priority, and the like. The custom module 218 may present the custom response time trend to the user 102, may store the custom response time trend, may adjust a response time trend based on the custom response time trend, or may perform another action with the custom response time trend.

In one embodiment, the action module 220 suggests an action to the user 102 relative to the recipient 104 based on the response time trend corresponding to the recipient 104. The action may comprise a suggested time for the user 102 to make additional contact with the recipient 104, a suggested method of contact for the user 102 to use to contact the recipient 104, such as email, telephone, or instant message contact, or the like. For example, in one embodiment, the action module 220 may suggest that the user 102 wait before sending an additional email to the recipient 104, until after a minimum, average, or maximum response time of the recipient 104 has passed, or may suggest that the user 102 contact the recipient 104 once a minimum, average, or maximum response time of the recipient 104 has passed.

In one embodiment, the response time display module 222 displays a list of email messages and displays a visual representation of a plurality of response time trends corresponding to a sender or recipient of the email messages. The response time display module 222 displays the visual representations such that each visual representation is visually associated with at least one of the email messages. A visual representation of a response time trend, in one embodiment, may comprise a color representing the response time trend, a number representing a minimum, average, maximum, or estimated response time, a graph, an icon, a marking on or around the email message, such as a highlighting, underlining, bolding, or italicizing the email message in the list, or another visual representation. Different representations may be given different meanings For example, in an embodiment where colors are used as a visual representation, green may be defined as representing a low range of response time trends, yellow a middle range, and red a high range.

In one embodiment, the response time display module 222 displays a list of emails received by the user 102, and displays a visual representation for each email in the list representing a response time trend of the sender of the email. This allows the user 102, optionally, to reciprocate or prioritize responses to received emails based on the response time trends of the received emails' senders. In another embodiment, the response time display module 222 displays a list of email sent by the user 102, and displays a visual representation of an estimated response time for each sent email in the list, based on response time trends of the recipients.

In one embodiment, the new message module 224 assists the user 102 in composing a new email message and dynamically determines an estimated response time for the new email message. The estimated response time, in one embodiment, is based on response time trends of recipients of the new email message. The new message module 224, in a further embodiment, dynamically updates the estimated response time as the user 102 adds or removes recipients, and may suggest additional recipients based on a content identifier for the new messages, based on other recipients, or based on reducing the estimated response time for the new email message.

Figure 3:
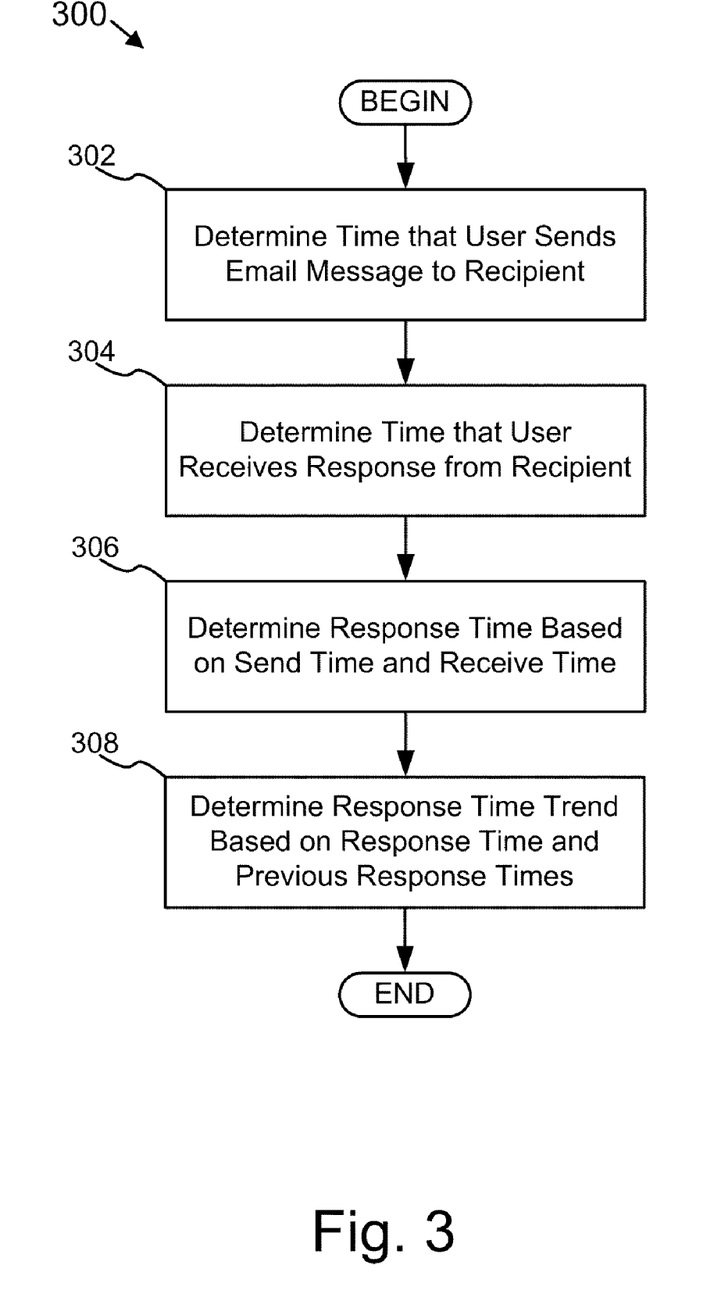
FIG. 3 is a schematic flow chart diagram illustrating one embodiment of a method for determining email response time trends in accordance with the present invention.

FIG. 3 depicts one embodiment of a method 300 for retaining email response time trends. The method 300 begins, and the send module 202 determines 302 a send time for an email message that the user 102 sends to a recipient 104. The receive module 204 determines 304 a receive time for a response that the user 102 receives to the email message from the recipient 104.

The response time module 206 determines 306 a response time for the email message based on an amount of time that elapses between the send time and the receive time. The trend module 208 determines 308 a response time trend for the recipient 104 based on the response time and on previous response times of the recipient 104, and the method 300 ends.

Figure 4:
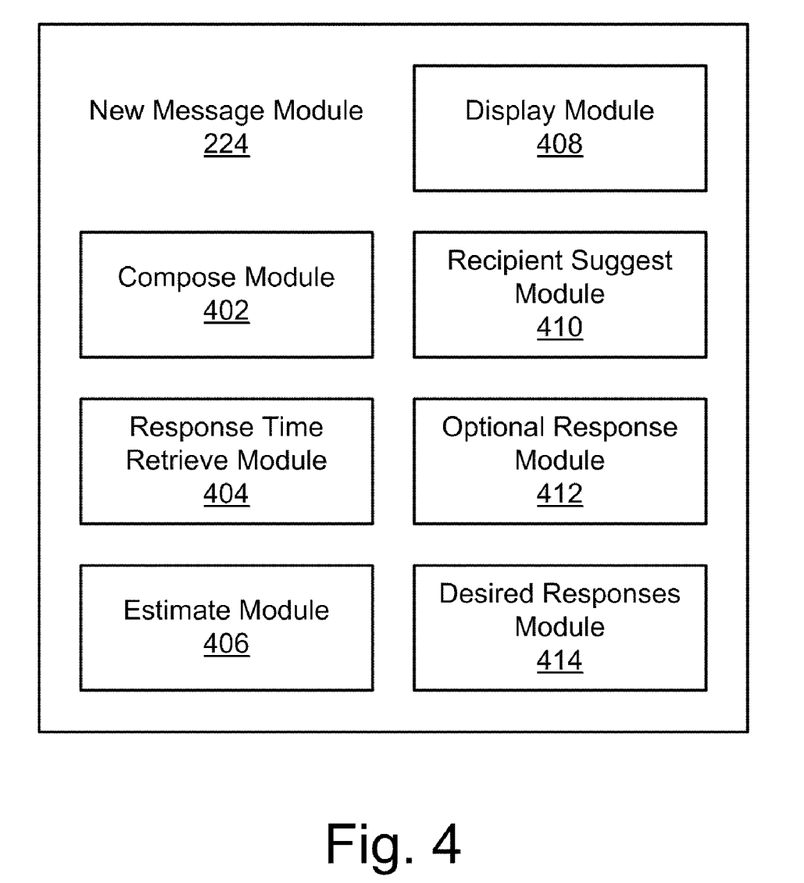
FIG. 4 is a schematic block diagram illustrating one embodiment of a new message module in accordance with the present invention.

FIG. 4 depicts one embodiment of a new message module 224. As described above, in general, the new message module 224 determines a set of new email recipients for a new email message from the user 102, determines a response time trend for each new email recipient, determines an estimated response time for the new email message, and displays a visual representation of the estimated response time to the user 102. In the depicted embodiment, the new message module 224 comprises a recipient module 402, a response time identification module 404, an estimate module 406, a display module 408, a recipient suggest module 410, an optional response module 412, and a desired responses module 414.

In one embodiment, the recipient module 402 determines a set of new email recipients identified by the user 102. The set of new email recipients comprises intended recipients of a new email message from the user 102. The user 102 may identify the set of new email recipients to the recipient module 402 as email addresses, names, screen-names, nicknames, and/or other recipient identifiers. The recipient module 402, in a further embodiment, may allow the user 102 to update the set of new email recipients by adding, removing, editing, or otherwise changing the new email recipients in the set of new email recipients.

The recipient module 402 may receive the set of new email recipients directly from the user 102 through a graphical display, or the like, or from another module, program, or the like. For example, the user 102 may enter one or more new email recipients into a "To" field of a graphical display for composing emails, or a separate module or program may send the set of new email recipients to the recipient module 402. In a further embodiment, the recipient module 402 may receive other portions of the new email message from the user 102, such as an email subject, an email body, and the like.

In one embodiment, the response time identification module 404 determines one or more response time trends. The response time identification module 404 may determine one or more response time trends for the set of new email recipients that the recipient module 402 receives. The response time identification module 404, in one embodiment, may determine a response time trend for each new email recipient. As described above, a response time trend may comprise historical response time information, an estimated response time, discrete response time values, such as minimum response time, average response time, and maximum response time, may be specific to a predefined time period, may be specific to a predefined content identifier, may be adjusted for schedule information, and the like. In one embodiment, the response time trend is specific to a time period that corresponds to a composition time for the new email message. In a further embodiment, the response time trend is specific to a content identifier for the new email message.

The response time identification module 404, in one embodiment, determines the response time trends by accessing stored response time trends. In one embodiment, the response time identification module 404 accesses response time trends corresponding to the one or more recipients 104 that the storage module 216 stores on the data storage repository 110, and the set of new email recipients are selected from the one or more recipients 104. In a further embodiment, the response time identification module 404 may receive response time trends from an email server, such as the email server 116, from another module, such as the trend module 208, from a data network, such as the data network 112, from a response time trend service provider, or the like.

In another embodiment, the response time identification module 404 determines the response time trends based on response times of the set of new email recipients, as described above with regard to the response time trend module 108. The response time identification module 404 may comprise or otherwise be in communication with one or more of the send module 202, the receive module 204, the response time module 206, and the trend module 208 to determine the response time trends, as described above.

In one embodiment, the estimate module 406 determines an estimated response time for the new email message based on one or more response time trends of the set of new email recipients. An estimated response time, in one embodiment, is an estimated amount of time in which the user 102 is likely to receive a response to the new email message. In a further embodiment, the estimate module 406 determines the estimated response time relative to a composition time for the new email message, estimating an amount of time in which the user 102 would be likely to receive a response to the new email message where the user 102 to send the new email message at the composition time. While a response time trend indicates a general tendency of a recipient to respond to an email message over time, an estimated response time is specific to a specific new email message and to a specific set of new email recipients.

The estimate module 406, in one embodiment, may determine the estimated response time based on one or more average response times of the new email recipients, one or more minimum response times of the new email recipients, one or more maximum response times of the new email recipients, or on other information from the one or more response time trends. In one embodiment, the estimated response time comprises the lowest average response time of new email recipient. In a further embodiment, the estimate module 406 may determine an individual estimated response time for each of the new email recipients.

In one embodiment, the estimate module 406 may determine the estimated response time based on one or more external factors. For example, in one embodiment, the estimate module 406 may determine the estimated response time based on a day of the week, a time of day, another time period corresponding to a composition time for the new email message, a content identifier for the new email message, schedule information of a new email recipient, or the like.

In a further embodiment, the estimate module 406 may adjust the estimated response time based on schedule information for one or more new email recipients, substantially as described with regard to the schedule module 212. As described above, schedule information may comprise a timezone, calendar items, and the like. In another embodiment, the schedule module 212 may adjust the response time trends based on schedule information, such that the estimated response time already reflects the schedule information.

The estimate module 406, in one embodiment, dynamically updates the estimated response time in response to the user 102 changing the new email recipients. For example, as the recipient module 402 assists the user 102 in adding, removing, or otherwise changing the new email recipients, the estimate module 406 may determine an updated estimated response time based on the changes. In a further embodiment, the estimate module 406 may determine and/or update the estimated response time in response to an action by the user 102, such as clicking an estimate button, a send button, or the like.

In one embodiment, the display module 408 displays a visual representation of the estimated response time that the estimate module 406 determines. The display module 408, in a further embodiment, may display a visual representation of a plurality of estimated response times, for example, an individual visual representation for each of the new email recipients or the like. In another embodiment, the display module 408 may further display a graphical display for the recipient module 402 to assist a user in composing the new email message and selecting the set of new email recipients. The display module 408 may display the visual representation of the estimated response time using an electronic display device, or the like, that is capable of displaying text and/or graphics, such as a display coupled to or in communication with the user computing device 106.

The display module 408, in one embodiment, displays the visual representation of the estimated response time to the user 102. The display module 408 may display the visual representations as part of a graphical display used by the recipient module 402, or as part of another graphical display. As described above, a visual representation, in one embodiment, may comprise a color representing the estimated response time, a number representing the estimated response time, a graph, an icon, a marking on or around a new email recipient, such as a highlighting, underlining, bolding, or italics, or another visual representation. Different representations may be given different meanings For example, in an embodiment where colors are used as a visual representation, green may be defined as representing a range of shorter estimated response times, yellow a range of medium estimated response times, and red a range of longer estimated response times.

In one embodiment, the display module 408 dynamically updates the visual representation. For example, in one embodiment, the display module 408 may update the visual representation in response to an update to the estimate module 406 updating the estimated response time. The display module 408, in one embodiment, may update just the visual representation, or, in another embodiment, may update an entire graphical display. In another embodiment, the display module 408 may dynamically update the displayed visual representation based on schedule information of one or more new email recipients. For example, in one embodiment, the display module 408 may add a representation of schedule information to a visual representation, may update the visual representation to reflect an adjusted estimated response time, or the like.

In a further embodiment, the display module 408 displays the visual representation in response to an action by the user 102, in response to an event, or the like. For example, in one embodiment, the display module 408 may display the visual representation in response to the user 102 selecting an estimate button, a send button, or the like, or the display module 408 may display the visual representation at a predetermined interval after the user 102 sends the new email message, or the like. The display module 408 may display the visual representation as part of another display or window, such as a compose email window, in a separate display or window, such as a pop-up notification, or may otherwise display the visual representation to the user.

In one embodiment, the recipient suggest module 410 suggests a suggested recipient to the user 102 for the user to add to the new email recipients. The recipient suggest module 410, in a further embodiment, may select the suggested recipient from a plurality of possible recipients, for example, recipients with whom the user 102 has previously corresponded, recipients for whom response time trends exist, and the like.

The recipient suggest module 410, in one embodiment, may select the suggested recipient such that the user 102 adding the suggested recipient to the new email recipients would lower the estimated response time. For example, the recipient suggest module 410 may select a recipient who has a shortest response time trend, or estimated response time as the suggested recipient.

In a further embodiment, the recipient suggest module 410 may select the suggested recipient based on a relationship between the suggested recipient and at least one of the new email recipients. The relationship between the suggested recipient and the at least one of the new email recipients may comprise a common characteristic, tag, attribute, or the like, previous emails from the user 102 to both recipients, a common content identifier or subject matter of emails between the user 102 and the recipients, or another relationship.

In another embodiment, the recipient suggest module 410 selects the suggested recipient based on a content identifier for the new email message. The recipient suggest module 410, in one embodiment, may parse content of the new email message, and compare contents of the new email message with previous emails between the user 102 and possible recipients, as described above with regard to the content identifier module 210. In another embodiment, the recipient module 410 may receive a content identifier for the new email message from the user 102, and may compare the received content identifier with the content identifiers of previous email messages to select the suggested recipient. The recipient suggest module 410, in a further embodiment, may combine a plurality of factors in selecting the suggested recipient.

In one embodiment, the optional response module 412 determines one or more optional response recipients identified for the new email message by the user 102. An optional response recipient, in one embodiment, comprises an intended recipient for the new email message whose response time trend is factored out of the estimated response time by the estimate module 406. By indicating that a recipient of the new email message is an optional response recipient, the user 102 can send the new email message to the recipient, but the recipient will not affect the estimated response time. The optional response module 412 may receive the one or more optional response recipients from the user 102 using a dedicated entry field in a graphical display, from a carbon copy ("CC") or blind carbon copy ("BCC") field, from another module, or may otherwise determine the one or more optional response recipients.

In one embodiment, the desired responses module 414 identifies a designation from the user 102 that represents a desired number of responses to the new email message. The user may provide the designation to the desired responses module 414 through an input field, by selecting or marking a number of new email recipients, or otherwise. In one embodiment, the estimate module 406, in response to the desired responses module 414 receiving the designation, updates an existing, or determines a new, estimated response time, based on an estimated amount of time in which the user 102 is likely to receive the desired number of responses to the new email message. For example, if the desired responses module 414 receives an amount of "three" from the user 102, the estimate module 406 may use the third shortest new email recipient response time as the estimated response time, or the like.

In another embodiment, the desired response module 414 identifies a plurality of designations from the user 102, and each designation corresponds to a subset of the set of new email recipients. For example, the user 102 may desire a certain number or responses from a first set of new email recipients, and also a certain number of responses from a second set of new email recipients. In one embodiment, the estimate module 406, in response to the desired responses module 414 receiving the plurality of designations, updates an existing or determines a new estimated response time, based on an estimated amount of time in which the user 102 is likely to receive each desired number of responses to the new email message from each subset of the set of new email recipients.

Figure 5:
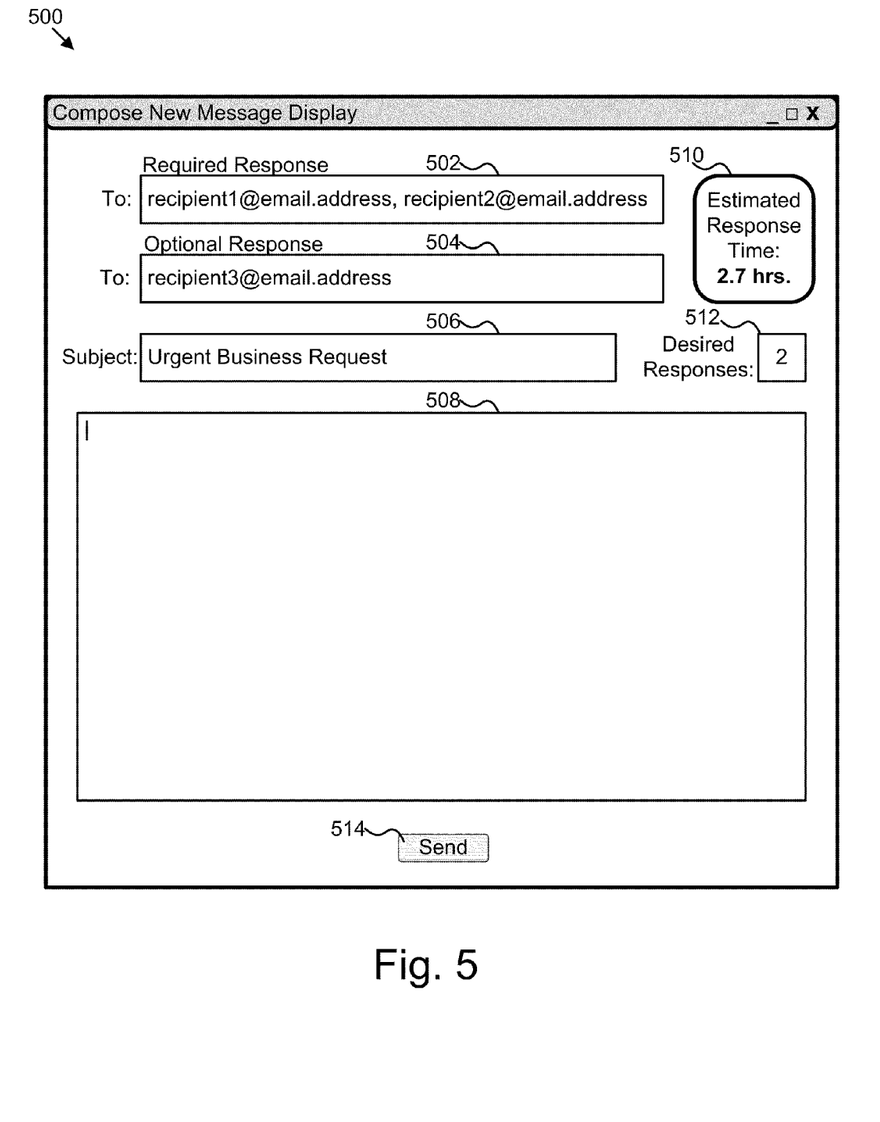
FIG. 5 is a schematic block diagram illustrating one embodiment of a graphical display for displaying an estimated response time while composing an email in accordance with the present invention.

FIG. 5 depicts one embodiment of a graphical display 500 for displaying an estimated response time while composing an email. The graphical display 500 may be displayed by the display module 408, or by another module. As depicted, the graphical display comprises a required response field 502, an optional response field 504, a subject field 506, a body field 508, a visual representation 510 of an estimated response time, a desired responses field 512, and a send button 514.

In one embodiment, the user 102 provides the set of new email recipients to the recipient module 402 in the required response field 502. In a further embodiment, the user 102 provides the one or more optional response recipients to the optional response module 412 in the optional response field 504. The user 102 may enter a subject for the new email message into the subject field 506, and an email body into the body field 508.

In one embodiment, the visual representation 510 represents the estimated response time that the estimate module 406 determines based on the new email recipients from the required response field 502. In the depicted embodiment, the visual representation 510 comprises alphanumeric text representing the estimated response time of "2.7 hrs." In another embodiment, as described above, the visual representation 510 may comprise a color, a graph, an icon, a marking on or around a new email recipient, or another visual representation. The display module 408 may dynamically update the visual representation 510 in response to the user 102 entering an additional new email recipient or removing a new email recipient from the required response field 502.

In one embodiment, the user provides a designation representing a desired number of responses to the desired responses module 414 in the desired responses field 512, and the visual representation 510 represents an estimated amount of time in which the user 102 is likely to receive the desired number of responses. As described above with regard to the desired responses module 414, in another embodiment, the desired responses field 512 may comprise a plurality of fields or other input tools allowing the user 102 to provide a plurality of designations for a plurality of groups of recipients, to select recipients or groups of recipients, or the like.

In one embodiment, upon completion of the new email message, the user 102 selects the send button 514, and the new message module 224 sends the new email message to the new email recipients from the required response field 502 and to the optional response recipients from the optional response field 504.

Figure 6:
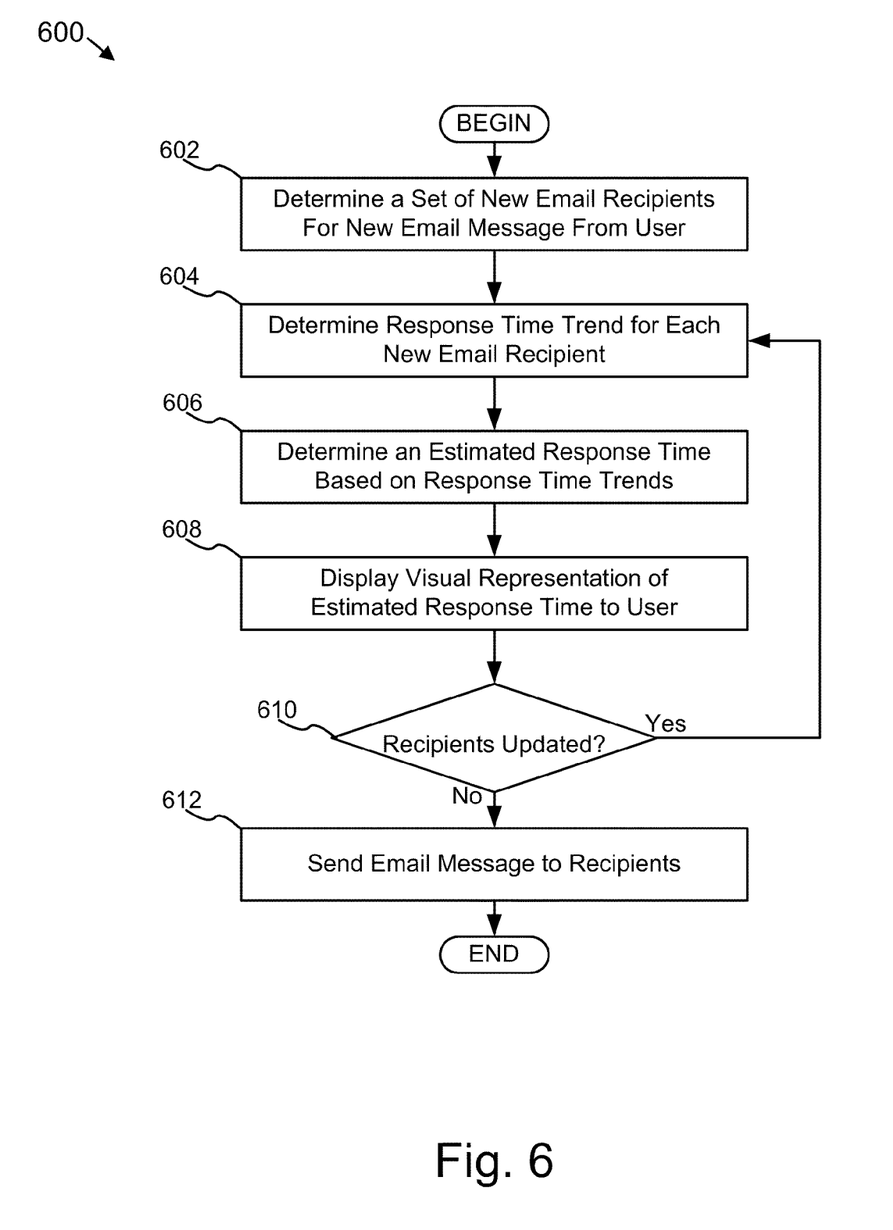
FIG. 6 is a schematic flow chart diagram illustrating one embodiment of a method to dynamically estimate a response time while composing an email in accordance with the present invention.

FIG. 6 depicts one embodiment of a method 600 to estimate a response time based on a set of recipients for an email message. The method 600 begins, and the recipient module 402 determines 602 a set of new email recipients for a new email message from the user 102. The response time identification module 404 determines 604 a response time trend for each new email recipient. In another embodiment, other modules, such as the response time module 206 and the trend module 208, assist the response time identification module 404 in determining 604 response time trends.

The estimate module 406 determines 606 an estimated response time based on the response time trend of each new email recipient. The display module 408 displays 608 a visual representation 510 of the estimated response time to the user 102. The recipient module 402 determines 610 whether the user 102 has updated the set of new email recipients. If the recipient module 402 determines 610 that the user 102 has updated the set of new email recipients, to update the estimated response time, the method 600 returns to the step of determining 604 a response time trend for each new email recipient, determining 606 an estimated response time, and displaying 608 a visual representation of the estimated response time. If the recipient module 402 determines 610 that the user 102 has not updated the set of new email recipients, upon completion of the new email message and a send action, using the send button 514 or the like, the new message module 224 sends 612 the new email message to the set of new email recipients and to any optional response recipients, and the method 600 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to estimate a response time based on a set of recipients for an email message, the method comprising:

determining a set of email recipients identified by a user, the set of email recipients comprising intended recipients of a new email message from the user;

determining one or more response times for each recipient from the set of email recipients, each response time based on an elapsed time between a send time a user sends an email message and a receive time the user receives a response to the email message;

determining a response time trend for each recipient from the set of email recipients, each response time trend based on the one or more response times of one of the recipients from the set of email recipients;

determining an estimated response time for the new email message based on the response time trends for each recipient;

displaying a visual representation of the estimated response time to the user;

suggesting a recipient from a plurality of recipients for the user to add to the set of email recipients based on a response time trend corresponding to the suggested recipient, such that an addition of the suggested recipient to the set of email recipients lowers the estimated response time;

determining one or more optional response recipients identified by the user, the one or more optional response recipients comprising intended recipients of the new email message whose response time trends are factored out of the estimated response time for the new email message; and identifying a designation from the user that represents a desired number of responses to the new email message, the estimated response time for the new email message comprising an estimated amount of time in which the user is likely to receive the desired number of responses to the new email message based on the response time trends.

2. The method of claim 1, further comprising dynamically updating the estimated response time for the new email message in response to the user updating the set of email recipients.

3. The method of claim 1, wherein the suggested recipient is further selected from a plurality of recipients based on a relationship between the suggested recipient and at least one recipient from the set of email recipients.

4. The method of claim 1, wherein the suggested recipient is further selected from a plurality of recipients based on a content identifier for the new email message.

5. The method of claim 1, wherein the estimated response time for the new email message is based on a content identifier for the new email message and further wherein each response time trend corresponds to the content identifier.

6. The method of claim 1, further comprising identifying a plurality of designations from the user, each designation corresponding to a subset of the set of email recipients, each designation representing a desired number of responses to the new email messages from the corresponding subset of the set of email recipients, wherein the estimated response time for the new email message comprises an estimated amount of time in which the user is likely to receive each desired number of responses from each subset of the set of email recipients.

7. The method of claim 1, further comprising updating the estimated response time for the new email message based on schedule information of at least one recipient from the set of email recipients.

8. The method of claim 7, wherein the schedule information comprises one or more calendar items.

9. The method of claim 1, wherein the estimated response time comprises one of a minimum estimated time, an average estimated time, and a maximum estimated time in which the user is likely to receive a response to the new email message based on the response time trend for each recipient from the set of email recipients.

10. The method of claim 1, further comprising determining an individual estimated response time for each recipient from the set of email recipients.

11. The method of claim 1, wherein the estimated response time is further based on a response time trend for a time period corresponding to a composition time for the new email message.

12. An apparatus to estimate a response time based on a set of recipients for an email message, the apparatus comprising:
 a recipient module configured to determine a set of email recipients identified by a user, the set of email recipients comprising intended recipients of a new email message from the user;
 a response time identification module configured to determine one or more response times for each recipient from the set of email recipients, each response time based on an elapsed time between a send time a user sends an email message and a receive time the user receives a response to the email message;
 a trend module configured to determine a response time trend for each recipient from the set of email recipients, each response time trend based on the one or more response times of one of the recipients from the set of email recipients;
 an estimate module configured to determine an estimated response time for the new email message based on the response time trends; and
 a display module configured to display a visual representation of the estimated response time to the user;
 a recipient suggest module configured to suggest a recipient from a plurality of recipients for the user to add to the set of email recipients based on a response time trend corresponding to the suggested recipient, such that an addition of the suggested recipient to the set of email recipients lowers the estimated response time;
 an optional response module configured to determine one or more optional response recipients identified by the user, the one or more optional response recipients comprising intended recipients of the new email message whose response time trends are factored out of the estimated response time for the new email message; and
 a desired response module configured to identify a designation from the user that represents a desired number of responses to the new email message, the estimated response time for the new email message comprising an estimated amount of time in which the user is likely to receive the desired number of responses to the new email message based on the response time trends.

13. The apparatus of claim 12, wherein the estimate module is further configured to dynamically update the estimated response time in response to the user updating the set of email recipients.

14. A computer program product comprising a non-transitory computer readable medium having computer usable program code executable to perform operations to estimate a response time based on a set of recipients for an email message, the operations of the computer program product comprising:
 determining a set of email recipients identified by a user, the set of email recipients comprising intended recipients of a new email message from the user;
 determining one or more response times for each recipient from the set of email recipients, each response time based on an elapsed time between a send time a user sends an email message and a receive time the user receives a response to the email message;
 determining a response time trend for each recipient from the set of email recipients, each response time trend based on the one or more response times of one of the recipients from the set of email recipients;
 determining an estimated response time for the new email message based on the response time trends for each recipient;
 displaying a visual representation of the estimated response time to the user;
 suggesting a recipient from a plurality of recipients for the user to add to the set of email recipients based on a response time trend corresponding to the suggested recipient, such that an addition of the suggested recipient to the set of email recipients lowers the estimated response time;
 determining one or more optional response recipients identified by the user, the one or more optional response recipients comprising intended recipients of the new email message whose response time trends are factored out of the estimated response time for the new email message; and
 identifying a designation from the user that represents a desired number of responses to the new email message, the estimated response time for the new email message comprising an estimated amount of time in which the user is likely to receive the desired number of responses to the new email message based on the response time trends.

* * * * *